(12) United States Patent
Jeon et al.

(10) Patent No.: US 8,147,885 B2
(45) Date of Patent: Apr. 3, 2012

(54) MANUFACTURING METHOD FOR FERMENTED SOYBEANS HAVING INCREASED GAMMA-AMINO BUTYRIC ACID CONTENT

(75) Inventors: Myoung-hee Jeon, Daejeon (KR); Seung-jin Lee, Choongeheongnam-do (KR); Byoung-koo Kwon, Choongeheongnam-do (KR); Yeong-il Chang, Daejeon (KR); Hee-kyoung Park, Seoul (KR); Jun-bong Choi, Seoul (KR)

(73) Assignee: CJ Cheiljedang Corporation, Seoul (KR)

( * ) Notice: Subject to any disclaimer, the term of this patent is extended or adjusted under 35 U.S.C. 154(b) by 379 days.

(21) Appl. No.: 12/159,173

(22) PCT Filed: Dec. 22, 2006

(86) PCT No.: PCT/KR2006/005659
§ 371 (c)(1),
(2), (4) Date: Jun. 25, 2008

(87) PCT Pub. No.: WO2007/075010
PCT Pub. Date: Jul. 5, 2007

(65) Prior Publication Data
US 2008/0311244 A1   Dec. 18, 2008

(30) Foreign Application Priority Data
Dec. 26, 2005   (KR) ........................ 10-2005-0129889

(51) Int. Cl.
*A23L 1/20* (2006.01)
(52) U.S. Cl. ....................................................... 426/46
(58) Field of Classification Search ..................... 426/46
See application file for complete search history.

(56) References Cited

U.S. PATENT DOCUMENTS
| | | | | |
|---|---|---|---|---|
| 5,244,790 A | * | 9/1993 | Kim | 435/42 |
| 2005/0202122 A1 | * | 9/2005 | Ichijo et al. | 426/52 |

FOREIGN PATENT DOCUMENTS
| | | |
|---|---|---|
| JP | 07227245 | 8/1995 |
| JP | 2004-187501 | 7/2004 |
| KR | 20040094489 | 10/2004 |

(Continued)

OTHER PUBLICATIONS

KR-9303098-1993. English Abstract.*

(Continued)

*Primary Examiner* — D. Lawrence Tarazano
*Assistant Examiner* — Hamid R Badr
(74) *Attorney, Agent, or Firm* — Occhiuti Rohlicek & Tsao LLP

(57) ABSTRACT

The present invention relates to a method of manufacturing fermented soybeans having increased gamma-aminobutyric acid (GABA) content, and more particularly, a method of manufacturing fermented soybeans having increased gamma-aminobutyric acid content which comprises the steps of: adding lactobacillus having glutamate decarboxylase (GAD) activity and glutamate (MSG) to soybeans; grinding and molding the mixture; and spraying starch powder mixed with seed malt onto the surface of the molded mixture. The present invention can provide a method of manufacturing fermented soybeans including GABA, which has been known to accelerate sodium ion discharge through urine, so that it may lower blood pressure hypertension which may be caused from excessive consumption of salts to prevent and can produce functional paste foods satisfying people's taste and desire for health.

5 Claims, 1 Drawing Sheet

FOREIGN PATENT DOCUMENTS

KR   200050068750   7/2005

OTHER PUBLICATIONS

Biosci. Biotechnol Biochem. vol. 64, 617-619 (Mar. 2000) Isato Kono etc.

Katagiri et al. "$\gamma$-Amino Butyric Acid Accumulation in Bean Sprouts (Soybean, Black Gram, Green Gram) Treated with Carbon Dioxide," *Nippon Shokuhin Kogyo Gakkaishi*, vol. 36, No. 11, pp. 916-919 (1989).

"GABA and fermented bean products" Food and Nutrition in China, vol. 11, Nov. 2005. English Translation of Abstract also enclosed.

* cited by examiner

[Fig. 1]
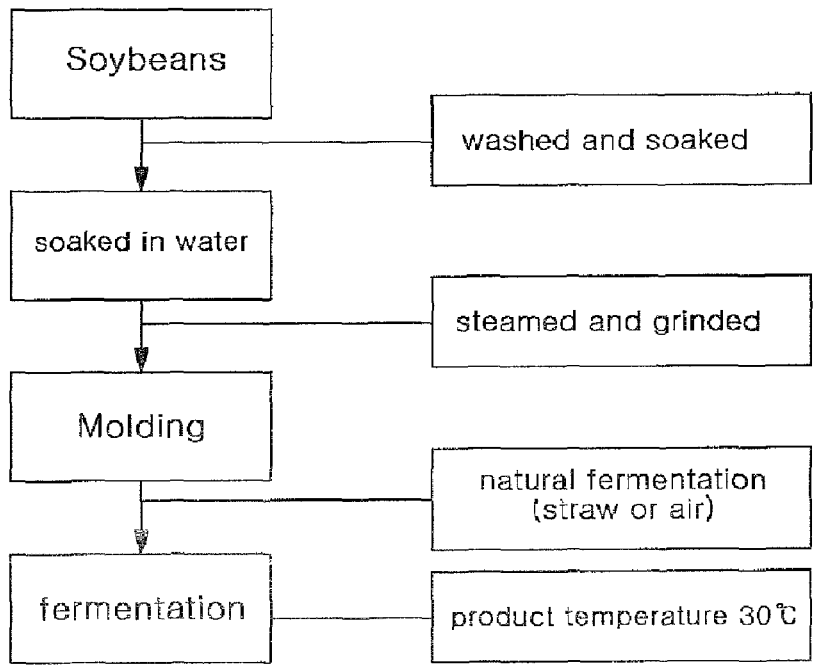
[Fig. 2]
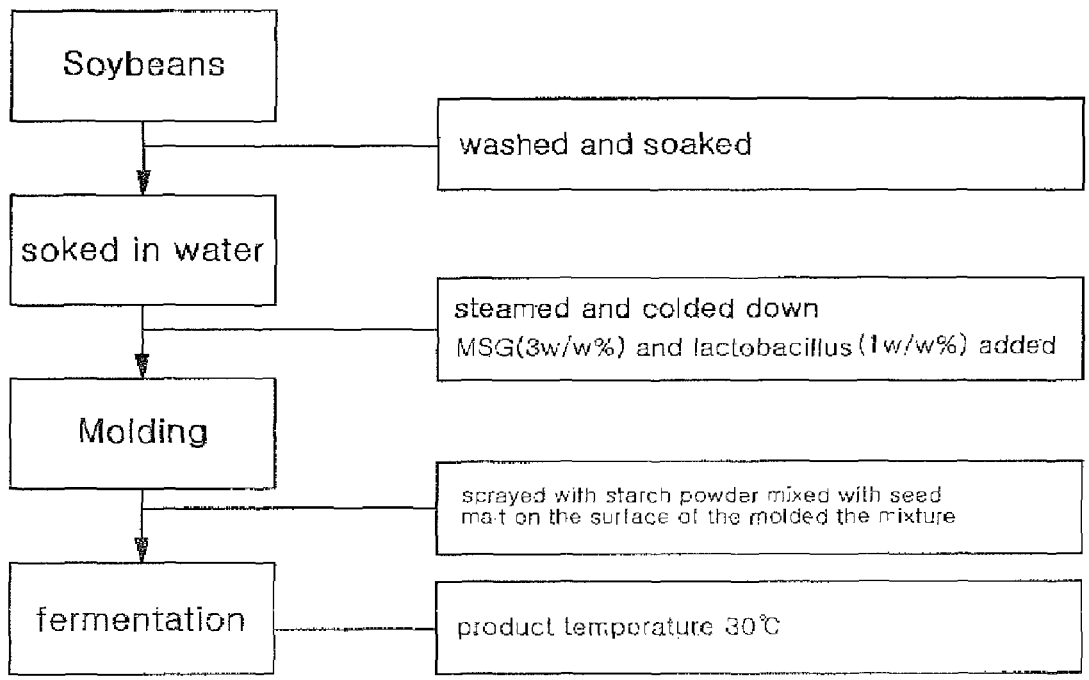

MANUFACTURING METHOD FOR FERMENTED SOYBEANS HAVING INCREASED GAMMA-AMINO BUTYRIC ACID CONTENT

CROSS-REFERENCE TO RELATED APPLICATIONS

This application is the National Stage of International Application No. PCT/KR2006/005659, filed on Dec. 22, 2006, which claims the priority of Korean Application No. 10-2005-0129889, filed Dec. 26, 2005. The contents of both applications are hereby incorporated by reference in their entirety.

TECHNICAL FIELD

The present invention relates to a method of manufacturing fermented soybeans having increased gamma-aminobutyric acid (GABA) content, and more particularly, a method of manufacturing fermented soybeans having increased gamma-aminobutyric acid content which comprises the steps of adding lactobacillus having glutamate decarboxylase (GAD) activity and glutamate to steamed soybeans; grinding and molding the mixture; and spraying starch powder mixed with seed malt onto the surface of the molded mixture.

BACKGROUND ART

Gamma-aminobutyric acid (GABA) is a non-protein constituent amino acid, widely found in animals and plants. Particularly in high-degree animals, GABA is known as an important neurotransmitter inhibitor, and in also known to promote blood circulation and increase oxygen supply to accelerate brain cell metabolism in the brain. Also, GABA is not only involved in prolactin secretion and growth hormone regulation, but it also lowers blood pressure and has pain relieving effects, thereby making itself a pharmacologically interesting compound.

It has been known that GABA accelerates sodium ion discharge through urine, so that it may lower blood pressure to prevent hypertension which may be caused from excessive consumption of salts.

According to previous reports, GABA can also accelerate alcohol metabolism, activate kidney functions, improve liver functions, and prevent obesity.

GABA is a kind of natural amino acid, which can also be generated during fermentation by lactobacillus. GABA is represented by the molecular formula: $H_2NCH_2 CH_2COOH$ and has the melting point of 203° C. It is highly soluble in water. When ingested by humans it is not accumulated in the body; namely, it is degraded without side effects.

Glutamate decarboxylase (GAD) is involved in the mechanism of GABA generation by fermentation of lactobacillus. The extracellular accumulation of metabolites in the late proliferation stage breaks the balance between extracellular and intracellular hydrogen ions ($H^+$), therefore a counter action to maintain the balance has to occur, during which GABA is generated. That is, when a kind of extracellular amino acid glutamate transfers inside cells, the intracellular hydrogen ions ($H^+$) are consumed by the carboxyl group of the glutamate being substituted for an intracellular accumulated hydrogen ion ($H^+$) to generate carbon dioxide ($CO_2$). Thereby, GABA is generated during the above process.

A previous study on increase of GABA content using soybeans reported that when soybeans were anaerobically treated with a gas such as nitrogen dioxide, GABA content increased about 7.4 fold (156.8V/100 g) compared with a control group (Mitsuaki et al., Gamma-aminobutyric acid Accumulation in Bean Sprouts (Soybean, Black Gram, Green Gram) Treated with Carbon Dioxide. Nippon Shokuhin Kogyo Gakkaishi. 36(11):916-919. 1989). However, such modified atmosphere method is very troublesome and investment for facilities are required.

Recent studies show that the glycosides included in soybeans or various fermented products from fermentation by microorganisms have physiological activities. Thus, Korean traditional fermented pastes came into the spotlight as health foods. Fermented soybeans (Meju in Korean) are used as major or sub-material for Korean traditional fermented paste, which has been an important protein source since long times ago. However, since this Korean fermented paste has a high salt content, it is a major cause of hypertension and various adult diseases mainly caused by excessive intake of salt.

The conventional method for producing fermented soybeans is as follows: soybeans are washed, soaked in water, steamed, and ground. Then, the ground soybeans are molded into various shapes such as a hexahedron, a cylinder, a sphere, etc, which are fermented by a natural microorganism. *Lactobacillus* is a very fastidious microorganism that grows better under anaerobic conditions than under aerobic conditions, and requires nutrients such as various amino acids, vitamins, salts and specific peptides, etc. Therefore, abundant nutrients contained in soybeans are sutable to grow lactobacillus and the inside of fermented soybeans naturally provide anaerobic conditions.

Also, organic acids generated by the metabolism of lactobacillus in fermented soybeans reduces the pH of fermented soybeans, as a result, which provide a suitable environment for GAD to be activated. In addition, such organic acids can prevent the contamination of other bacteria during the fermentation of the soybean in the air, thereby preparing the fermented soybeans of regular quality. Nevertheless, a method of manufacturing fermented soybeans using lactobacillus together with glutamate has not yet been proposed.

DISCLOSURE OF INVENTION

Technical Problem

It is an object of the present invention, in order to overcome the problems of the conventional methods, to provide a method of manufacturing fermented soybeans with increased GABA content comprising the step of adding lactobacillus having glutamate decarboxylase activity and glutamate to soybeans at mold formation of the fermented soybeans so as to increase the content of GABA therein.

Technical Solution

To achieve the above object, the present invention provides a method of manufacturing fermented soybeans with increased GABA content, comprising the steps of adding lactobacillus having glutamate decarboxylase activity and glutamate to steamed beans to form a mixture; grinding and molding the mixture; and spraying starch diluent containing mold onto the surface of the molded mixture, and fermenting the molded mixture.

The beans used herein are at least one or more selected from a group consisting of soybeans, bean flour, defatted soybeans, kidney beans, mung-beans, and their processed products.

The lactobacillus used herein is either a single or mixture of at least two of those having glutamate decarboxylase (GAD)

activity. For example, the lactobacillus can be at least one or more selected from a group consisting of *Lactobacillus* spp, *Bifidobacterium* spp, *Leuconostoc* spp and *Streptococcus*. spp.

The amount of glutamate added as a substrate of gamma-aminobutyric acid (GABA) is, preferably but not limited to, 1~20% by weight of the steamed soybean.

The mold used herein can be *Aspergillus oryzae*.

The present inventors have studied the fermentation conditions to produce GABA by lactobacillus for the purpose of applying the conditions to the fermentation of the Korean traditional soybean paste. In the course of the study, the present inventors discovered and completed this invention by finding out the fact that lactobacillus can grow inside fermented soybeans and its metabolite, an organic acid, generated during the growth can activate GAD to produce GABA.

The conventional method of manufacturing fermented soybeans, as shown in FIG. 1, is as follows: the steamed protein material such as beans is soaked in water, molded and fermented.

The conventional method for accumulation of GABA using the soybean as a starting material is that the soybeans are soaked in water for sprouting or unaerobically treating with a gas such as nitrogen dioxide and therefore the GABA content in fermented soybeans are increased. By this method, the GABA production can be slightly increased as compared with a control, but it is not enough and physical treatments have to be taken. However, the fermentation using lactobacillus has the advantages of increasing the content of GABA even under the conventional culture conditions without additional physical facilities.

The fermented soybeans with increased GABA content can supplement the various vegetables and grains, which contain naturally too small amount of GABA to exhibit physiological effects, and can further be a target for functional fermented paste food satisfying the consumers interested in well-being and sitting on the threshold of an aging society.

Hereinafter, the present invention is described in detail.

The method of manufacturing fermented soybeans according to the present invention comprises the steps of soaking soybeans in water, washing, steaming, and grinding; then adding lactobacillus having GAD activity and glutamate (MSG) to the soybeans to form a mixture; molding the mixture; and spraying starch diluent containing mold on the surface of the molded soybeans; and fermenting them.

The beans used herein are one or more selected from a group consisting of soybeans, bean flour, defatted soybeans, kidney beans, mung-beans, and their processed products.

The soak of the soybeans is preferably performed in water for 10~18 hours.

The lactobacillus having GAD activity herein is either a single or mixture of at least two of those having GAD activity. For example, *Lactobacillus* spp having strong GAD activity is preferably used, but not limited to, and any lactobacillus having GAD activity can be used. Also, the lactobacillus is preferably cultured in MRS medium (Peptone 10 g, Beef extract 10 g, Yeast extract 5 g, Dextrose 20 g, Polysorbate 80 1 g, Ammonium citric acid 2 g, Sodium acetic acid 5 g, Magnesium sulfate, 0.1 g, Manganese sulfate 0.05 g, Dipotassium phosphate 2 g, Distilled water 1,000□, pH 6.5±0.2) at 30° C. for 12~24 hours and at this time the culture medium is added at the volume of 0.5~1.0 w/w %.

The amount of adding lactobacillus for fermentation is determined by the strain. For example, $10^6$~$10^7$ CFU/g (for steamed soybeans) is the preferable content. The higher the initial inoculation, the higher the GABA production is and the less the contamination by other bacteria is. The time point of adding lactobacillus is any time after the medium is sterilized and cooled down so that the medium temperature is around 30° C., so as not to interrupt the growth of the lactobacillus.

The amount of glutamate (MSG) added as a substrate of GABA is, preferably, but not limited to, 1~20% for the steamed soybeans and 1~5% is more preferred.

The mold used herein can be *Aspergillus oryzae*.

The starch diluent used herein is prepared by mixing a mold (*Aspergillus oryzae*) at the ratio of 0.1~1.0 w/w % with starch powder to 1.0~5.0 w/w % to the total weight of the starch diluent.

The starch diluent is sprayed on the surface of the fermented soybeans, followed by fermentation at 25~35° C. for 60~72 hours. The starch powder used herein is selected from a group consisting of wheat flour, rice flour, wheat corn starch flour, glutinous rice flour, barley flour, etc.

After fermentation, GABA is measured by gas chromatography (GC) and at this time the unit is □%. The conversion rate (%) is calculated by the following formula: (generated GABA mmole/added glutamate mmol)×100.

The present invention also provides a method of manufacturing traditional fermented food containing the fermented soybeans with increased GABA as a main component, prepared by the method of manufacturing the fermented soybeans according to the present invention.

The traditional fermented food herein is Doenjang in Korean (soybean paste), hot pepper paste, soy sauce or Ssamjang in Korean (seasoned soybean paste or hot pepper paste).

BRIEF DESCRIPTION OF THE DRAWINGS

FIG. 1 is a flow diagram illustrating the conventional manufacturing process of the fermented soybeans.

FIG. 2 is a flow diagram illustrating the method of manufacturing fermented soybeans with GABA of the present invention.

BEST MODE FOR CARRYING OUT THE INVENTION

Hereinafter, the embodiments of the present invention will be described in detail with reference to the accompanying drawings.

Example 1

Soybeans were soaked in water at 20° C. for 18 hours, washed, and steamed at 121° C. for 15 minutes. At this time, the pH of the steamed soybeans was approximately 6.0. The steamed soybeans were cooled down to 30° C. The steamed soybeans mixed with 1 w/w % culture solution prepared by culturing *Lactobacillus* spp in a MRS medium (Peptone 10 g, Beef extract 10 g, Yeast extract 5 g, Dextrose 20 g, Polysorbate 80 1 g, Ammonium citric acid 2 g, Sodium acetic acid 5 g, Magnesium sulfate 0.1 g, Manganese sulfate 0.05 g, Dipotassium phosphate 2 g, Distilled water 1,000□, pH 6.5) supplemented with 3 w/w % monosodium glutamate (MSG) at 30° C. for 24 hours was added. The mixture was ground and molded into a chosen size (5□×3□×3□). The diluent prepared by mixing *Aspergillus oryzae* and starch powder at the ratio of 0.1 w/w % to 1 w/w % to the total weight of the diluent was sprayed onto the surface of the molded mixture, followed by fermentation at 30° C. for 12 hours.

After fermentation, GABA content was measured and the result is shown in Table 1.

GABA was measured by gas chromatography (GC) with the unit of ☐%. The conversion rate (%) was calculated by the following formula: (generated GABA mmol/added glutamate mmole)×100.

Example 2

An experiment was performed in the same manner as described in Example 1, except that fermentation was performed for 24 hours. The result of GABA measurement is shown in Table 1.

Example 3

An experiment was performed in the same manner as described in Example 1, except that fermentation was performed for 36 hours. The result of GABA measurement is shown in Table 1.

Example 4

An experiment was performed in the same manner as described in Example 1, except that fermentation was performed for 48 hours. The result of GABA measurement is shown in Table 1.

Example 5

An experiment was performed in the same manner as described in Example 1, except that fermentation was performed for 60 hours. The result of GABA measurement is shown in Table 1.

Example 6

An experiment was performed in the same manner as described in Example 1, except that fermentation was performed for 72 hours. The result of GABA measurement is shown in Table 1.

TABLE 1

| Example | GABA (mg %) | Conversion rate (%) |
| --- | --- | --- |
| Example1 | 215 | 13 |
| Example2 | 677 | 41 |
| Example3 | 990 | 60 |
| Example4 | 1,238 | 75 |
| Example5 | 1,321 | 80 |
| Example6 | 1,337 | 81 |

TABLE 1-continued

GABA content increased as up to 60 hours of fermentation, and from then on no significant GABA increase was detected. The increase of GABA content with the increase of fermentation time seems to be attributed to the activation of GAD resulting from the decrease of pH of fermented soybeans by the generated organic acid from the lactobacillus. After 60 hours of fermentation, the growth activity of the lactobacillus was decreased and thus GABA content did not increase any more.

INDUSTRIAL APPLICABILITY

As explained above, in the present invention lactobacillus having GAD activity and glutamate was added to fermented soybeans to increase the content of GABA, which is a functional factor exhibiting wide effects on various physiological activities, and thereby highly valuable functional paste products can be produced using the method of the present invention.

The invention claimed is:

1. A method of manufacturing fermented soybeans comprising the steps of: adding lactic acid bacteria having decarboxylase activity and glutamate to steamed beans to form a mixture; grinding and molding the mixture; spraying a starch solution that contains *Aspergillus oryzae* onto the surface of the molded mixture; and fermenting the mixture for 60 to 72 hours.

2. The method of manufacturing fermented soybeans according to claim 1, wherein the lactic acid bacteria includes a single or mixture of at least two kinds of lactic acid bacteria having decarboxylase activity.

3. The method of manufacturing fermented soybeans according to claim 1, wherein the lactic acid bacteria is at least one or more strains selected from a group consisting of *Lactobacillus* spp, *Bifidobacterium* spp, *Leuconostoc* spp, and *Streptococcus* spp.

4. The method of manufacturing fermented soybeans according to claim 1, wherein the glutamate is added at 1-20% by weight of the steamed soybeans.

5. The method of manufacturing fermented soybeans according to claim 1, wherein the beans are at least one or more selected from a group consisting of soybeans, bean flour, defatted soybeans, kidney beans, mung-beans, and their processed products.

* * * * *